United States Patent
Chong

(10) Patent No.: US 7,111,027 B2
(45) Date of Patent: Sep. 19, 2006

(54) METHOD FOR AUTOMATICALLY ADDING SCALE SYMBOL TO OPERATION FORMULA DURING OPERATION AND SYSTEM EXECUTING THE METHOD

(75) Inventor: Gaai Ting Chong, Taipei Hsien (TW)

(73) Assignee: Kinpo Electronics, Inc., Taipei (TW)

( * ) Notice: Subject to any disclaimer, the term of this patent is extended or adjusted under 35 U.S.C. 154(b) by 722 days.

(21) Appl. No.: 10/271,731

(22) Filed: Oct. 17, 2002

(65) Prior Publication Data
US 2004/0078400 A1   Apr. 22, 2004

(51) Int. Cl.
*G06F 3/00* (2006.01)

(52) U.S. Cl. .................................... 708/171

(58) Field of Classification Search ............... 708/137, 708/160, 171
See application file for complete search history.

(56) References Cited

U.S. PATENT DOCUMENTS

| | | | | |
|---|---|---|---|---|
| 4,081,859 A | * | 3/1978 | Goldsamt et al. | 708/137 |
| 4,488,250 A | * | 12/1984 | Lipsey et al. | 708/137 |
| 4,545,022 A | * | 10/1985 | Hughins | 708/137 |
| 5,050,115 A | * | 9/1991 | Matsuda et al. | 708/137 |
| 5,126,958 A | * | 6/1992 | Genda | 708/171 |
| 5,138,566 A | * | 8/1992 | Comforti | 708/137 |
| 5,272,653 A | * | 12/1993 | Meta et al. | 708/142 |

* cited by examiner

*Primary Examiner*—Tan V. Mai
(74) *Attorney, Agent, or Firm*—Bacon & Thomas, PLLC

(57) ABSTRACT

Method for automatically adding scale symbol to operation formula during operation and system for executing the method. The system includes: an input unit for keying in operands and choosing the scale thereof; an input/output buffering unit for temporarily storing the input data; a synchronously checking unit for checking the whether the input operands conform with the scale; a scale symbol adding unit for reading and automatically providing the symbol of the scale and sending the symbol to the input/output buffering unit and a mathematic logic calculating unit to be operated and wait for further instruction. After operated, the data are displayed by an output unit or stored in a memory. The data can be stored in both a read-only memory for check in next use or temporarily stored in a dynamic random access memory for checking the data source of the result and the scale.

4 Claims, 4 Drawing Sheets

METHOD FOR AUTOMATICALLY ADDING SCALE SYMBOL TO OPERATION FORMULA DURING OPERATION AND SYSTEM EXECUTING THE METHOD

BACKGROUND OF THE INVENTION

The present invention is related to a method for automatically adding a scale symbol to an operation formula during operation and a system for executing the method. By means of the method and system, a user can always clearly know the scale on which the operation formula is based and the switch between the scales. This simplifies the operation steps and shortens the operation time and enhances the operation efficiency.

In daily life, calculators are widely used in various fields. Many types of calculators are commercially available such as cell-driven type, solar energy type, calculator in built in an electronic dictionary, commercially used type, engineering-used type, etc. Such calculators enable users to calculate all kinds of numerals.

A conventional simple calculator provides basic operation functions including addition, subtraction, multiplication, division, etc. It is known that the data are processed in the digital equipment by way of binary scale. However, in normal time the digitals are presented by way of decimal scale. With respect to drafting of program commands in engineering technique, octanary and hexadecimal scales are often used. The conventional calculator can only operate and show the data directly keyed in by an operator according to the above different scales, while failing to automatically show the symbol of the scale in the operation formulas. Therefore, when it is necessary to show such symbol of scale, a user himself/herself needs to key in the symbols one by one for identifying or realizing the scales and values of the keyed in data. By means of the symbols of scales, the user can know the scale on which the numerals are based and make sure that the result of operation is correct.

SUMMARY OF THE INVENTION

It is therefore a primary object of the present invention to provide a method for automatically adding scale symbol to operation formula during operation and system for executing the method. The system includes a scale symbol adding unit connected between an input/output buffering unit and a mathematic logic calculating unit. When an operator is added to operate the operands, according to the chosen scale mode, the scale symbol adding unit automatically provides the symbol of the scale and the symbol is displayed next to the operands by a display for a user to conveniently identify. The mathematic logic calculating unit is able to calculate the input operands according to the chosen scale and obtain a result. A user can easily check and ensure the correctness of the result. Therefore, the error of the result can be minimized and the scale modes can be conveniently switched.

It is a further object of the present invention to provide the above method and system, in which a synchronously checking unit is connected between the input/output buffering unit and the scale symbol adding unit. The synchronously checking unit serves to check whether the input operands conform with the scale, for example, whether the numeral is greater than the allowable maximum value of the chosen scale. In not, the operand cannot be input so as to minimize the error of the operation result.

It is still a further object of the present invention to provide the above method and system in which a read-only memory is connected between a dynamic random access memory and the mathematic logic calculating unit. In the case that the synchronously checking unit or the scale symbol adding unit fails to complete the given operation, the program command in the read-only memory is activated to complete the operation. The operation formula and the result can be also stored in the read-only memory for next check and use.

It is still a further object of the present invention to provide the above method and system in which the method includes steps of: choosing a scale; inputting operands into the system; inputting an operator; and displaying the scale symbol next to the operands of the operation formula when the operands are completely input. When inputting the operator, the scale symbol adding unit automatically provides the symbol of the scale such as h representing hexadecimal scale. The symbol is displayed next to the operand by a display. At the same time, the operation result is converted into the value resulting from the currently chosen scale and further displayed. The scale modes can be further switched as necessary.

The present invention can be best understood through the following description and accompanying drawings wherein:

DETAILED DESCRIPTION OF THE PREFERRED EMBODIMENTS

Figure 1:
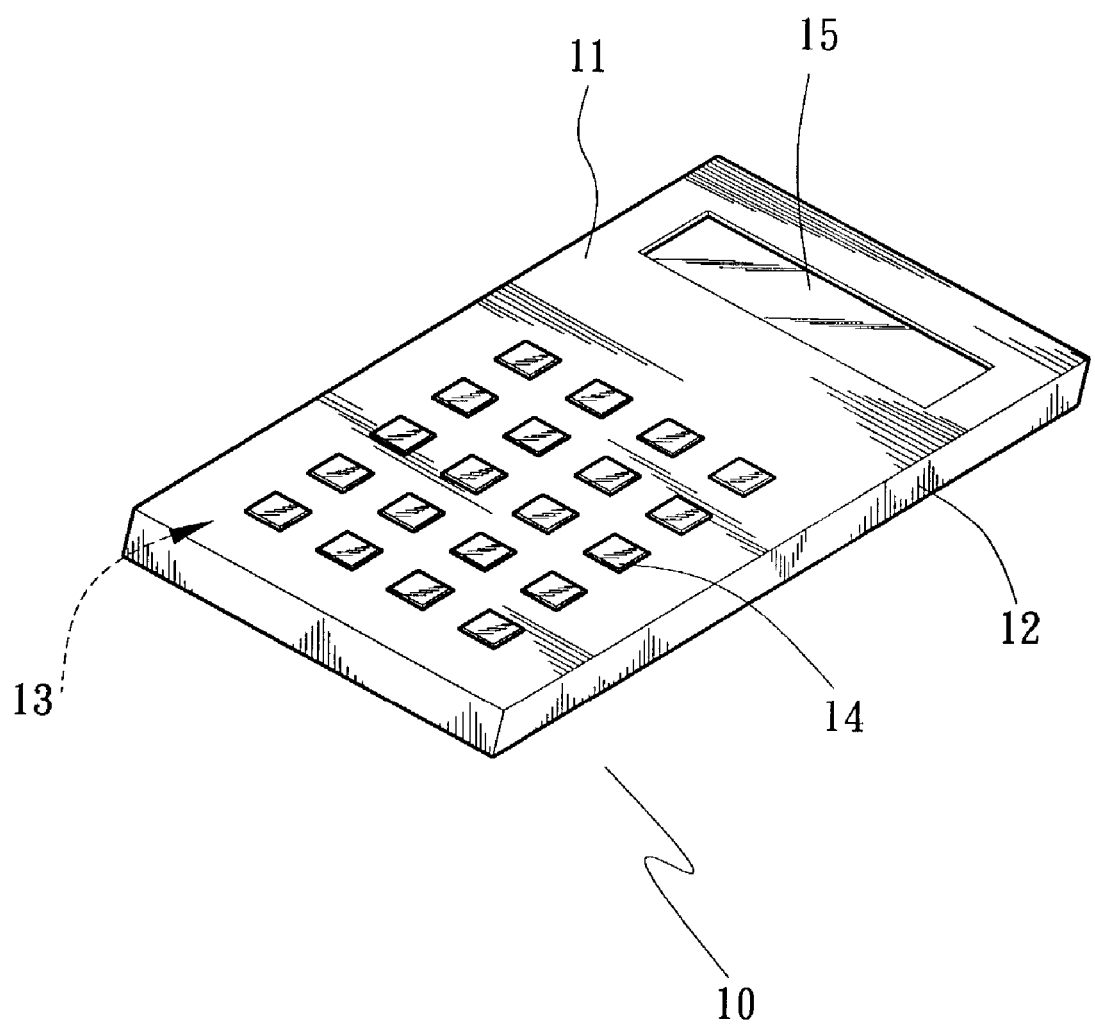
FIG. 1 is a perspective view of the calculator of the present invention.
Figure 2:
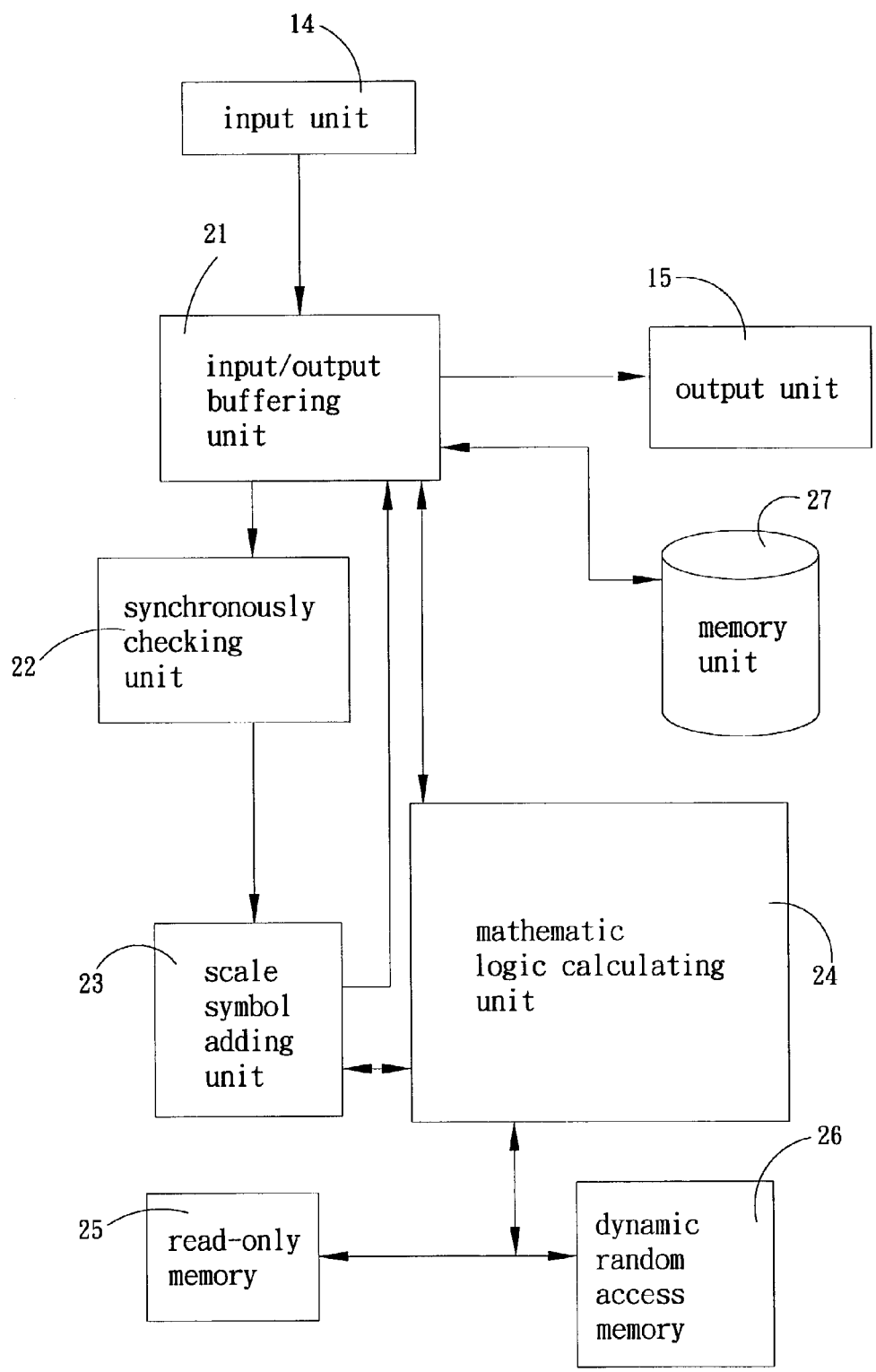
FIG. 2 is a block diagram of the internal units of the present invention.

Please refer to FIGS. 1 and 2. The calculator 10 of the present invention includes a housing 11 made of insulating material and defining an internal chamber 13. In a preferred embodiment of the present invention, an electronic circuit 20 is arranged in the chamber 13. Predetermined sections of the housing 11 are perforated, permitting the keys of the input unit 14 and the output unit 15 to protrude from the housing 11.

The calculator 10 includes an input unit 14, an input/output buffering unit 21 and a scale symbol adding unit 23.

The input unit 14 is for a user to input data. The user first switches the scale mode or chooses the scale of the operand as shown by block A of FIG. 4. Then the user inputs the operand to be operated on as shown by block B of FIG. 4.

The input/output buffering unit 21 serves to temporarily store the input data, whereby when the calculator 10 performs the operation, the user can further input data. A synchronously checking unit 22 is used to read the data temporarily stored in the input/output buffering unit 21 and further check the conformity between the input characters and preset scale. For example, in the case that the user chooses symbol o representing octanary scale and a numeral greater than 7 is input, this means the input data are incorrect. Under such circumstance, it will be impossible to complete the input. The unit will wait or ask the user to input again. Moreover, when input, the synchronously checking unit 22 will again read the next data temporarily stored in the input/output buffering unit 21 and repeat the check until the input characters conform with the scale. At this time, the numerals can be input.

The scale symbol adding unit 23 is connected with the synchronously checking unit 22. When inputting the operator, the scale symbol adding unit 23 provides the symbol of the scale of the operand and sends the symbol to the input/output buffering unit 21. The symbol is displayed next to the operand by the output unit (display) 15 (as shown by block C of FIG. 4). At the same time, the digital data to be operated will be sent to a mathematic logic calculating unit 24 and converted into the value resulting from the currently chosen scale. The numerals are then sent to the input/output buffering unit 21 and displayed on the output unit 15 together with the scale symbol (as shown by block D of FIG. 4).

After inputting the operator, in the case that another operand is input, the scale mode is first switched or chosen as necessary. If the scale mode is not changed, it is unnecessary to switch the scale mode. Then the numeral or operand to be operated and the operator are input as shown by blocks E and F of FIG. 4. The above procedure is repeated until the entire operation formula is completed. Then the sign of equation is keyed in or entered, the total value based on the currently chosen scale is obtained (as shown by block G of FIG. 4).

In the case that the user needs to add the results of many operation formulas to one another or subtract the results (that is, the normally seen M+ and M− functions), the calculator will store the results of the completed operation formulas into the memory unit 27 for successive operation.

The finally calculated result is displayed along with the scale symbol. When switching the scale mode, the numerals can be converted and displayed between different scales. The data are temporarily stored in DRAM 26 for convenient check in next use. The data to be displayed are sent from the input/output buffering unit 21 to the output unit 15 and displayed.

Figure 3:
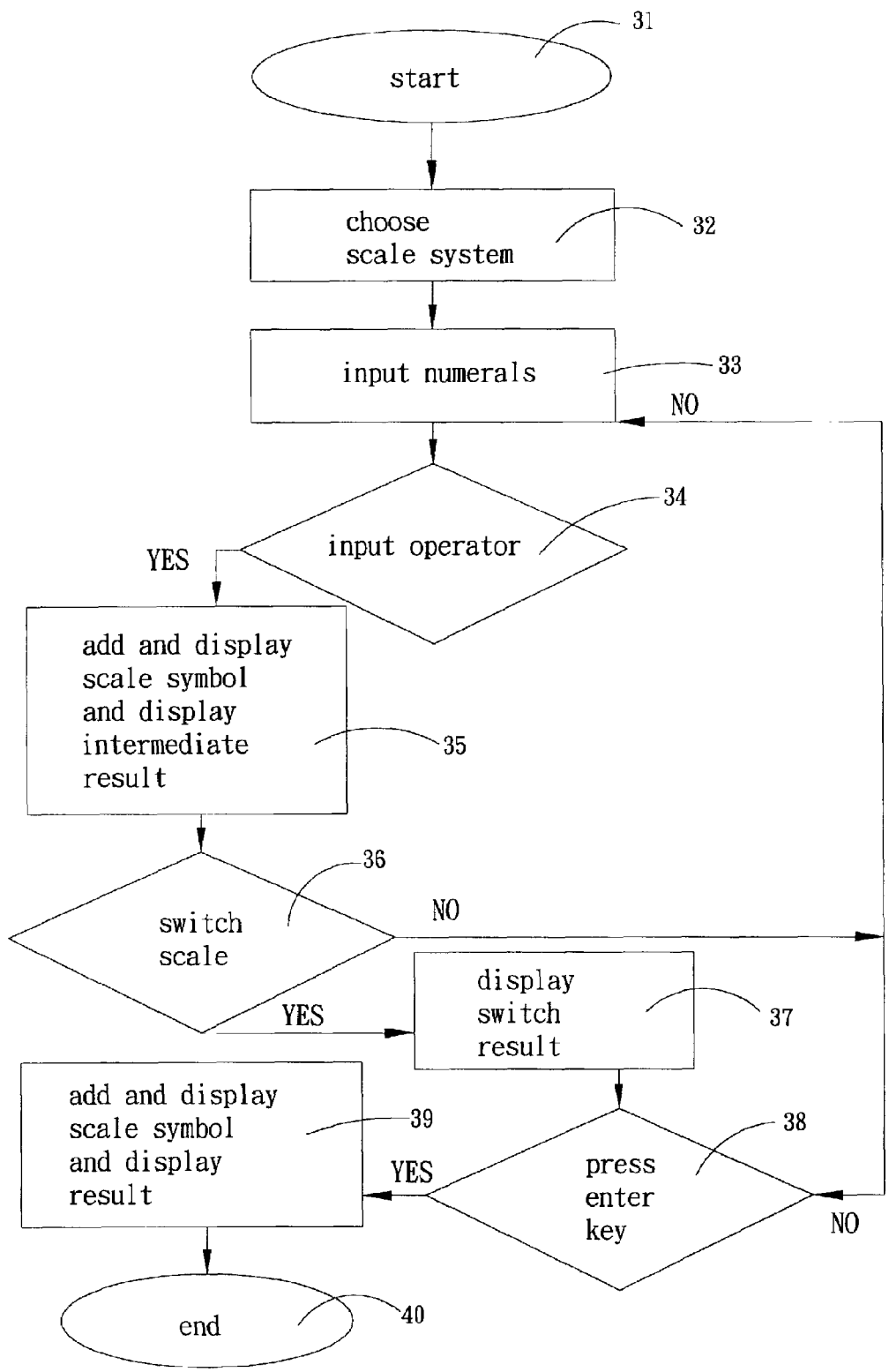
FIG. 3 is a flow chart of the data processing method of the present invention.
Figure 4:
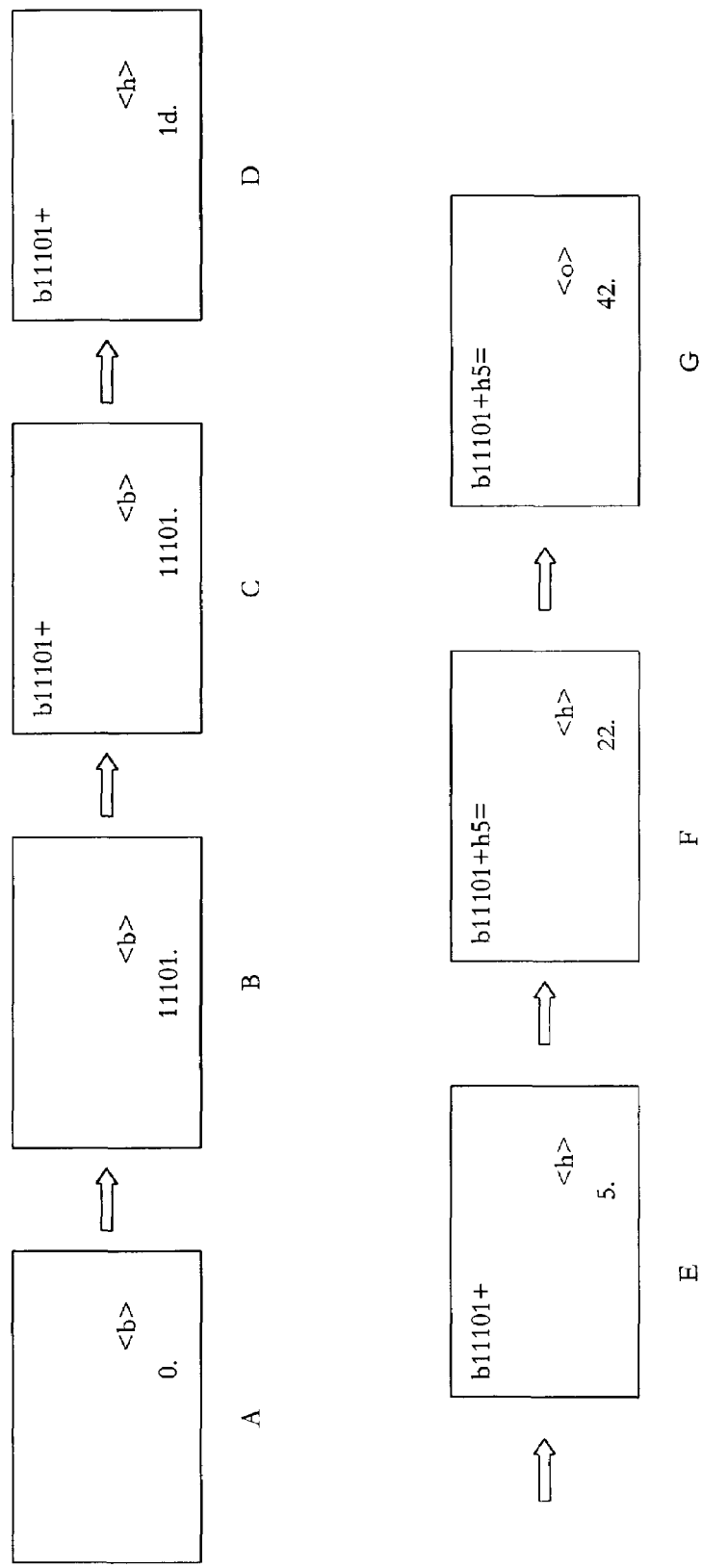
FIG. 4 shows an example of display of the operated data of the present invention.

Referring to FIGS. 2 to 4, the present invention has the following advantages:

1. The user can read and identify from the output unit 15 the scale on which the operation formula is based. Also, the user can identify the procedure and the scales of the respective operands and the switch between the scales of the results of operation. Therefore, the user can easily realize the scale on which the operation formula is based. Also, the user can readily check the results during operation to ensure the correctness. Moreover, the numerals can be switched between different scales for convenience in use.
2. The input/output buffering unit 21 is connected with the synchronously checking unit 22 for checking the input operands and the symbols of the scales. Only when the operands conform with the scale, the numerals can be input to execute the next step. Therefore, it is ensured that the user inputs operands in conformity with the scale and incorrect results of operation is avoided.
3. After being checked by the synchronously checking unit 22, the operand is sent to the scale symbol adding unit 23 which automatically provides the symbol of the scale. At the same time, the digital data to be operated on are sent to the mathematic logic calculating unit 24 and switched between different scales and operated on. Therefore, the user can conveniently calculate the numerals by way of various scales as necessary.

The above embodiments are only used to illustrate the present invention, not intended to limit the scope thereof. Many modifications of the above embodiments can be made without departing from the spirit of the present invention.

What is claimed is:

1. A method for automatically adding a scale symbol to an operation formula during operation, said method comprising steps of:
   (a) inputting a chosen scale and operands into a system;
   (b) ensuring that the operands are completely input when inputting an operator;
   (c) displaying the scale symbol next to the operands of the operation formula when the operands are completely input;
   (d) converting a scale of data and displaying the data when inputting a switched scale symbol; and
   (e) displaying the scale symbol, operation formula and operation result when inputting an execution command or pressing an execution key.

2. A method as claimed in claim 1, wherein after step (b), the input scale and the operand are synchronously compared and checked, whereby only the operand in conformity with the scale can be input.

3. A method for automatically adding a scale symbol to an operation formula during operation, said method comprising the steps of:
   (a) inputting a chosen scale and operands into a system;
   (b) ensuring that the operands are completely input when inputting an operator;
   (c) displaying the scale symbol next to the operands of the operation formula when the operands are completely input; and
   (d) displaying the scale symbol, operation formula and operation result when inputting an execution command or pressing an execution key.

4. A method as claimed in claim 3, wherein after step (b), the input scale and the operand are synchronously compared and checked, whereby only the operand in conformity with the scale can be input.

* * * * *